United States Patent [19]
Katagiri

[11] Patent Number: 5,548,367
[45] Date of Patent: Aug. 20, 1996

[54] ELECTROMAGNET APPARATUS AND APPARATUS FOR ADJUSTING EXPOSURE OF CAMERA USING THE SAME

[75] Inventor: Moriya Katagiri, Tachikawa, Japan

[73] Assignee: Olympus Optical Co., Ltd., Tokyo, Japan

[21] Appl. No.: 535,659

[22] Filed: Sep. 28, 1995

Related U.S. Application Data

[62] Division of Ser. No. 258,094, Jun. 10, 1994.

[30] Foreign Application Priority Data

Jun. 17, 1993 [JP] Japan .................................. 5-146468
Jun. 18, 1993 [JP] Japan .................................. 5-147878

[51] Int. Cl.⁶ ........................... G03B 9/08; G03B 9/07
[52] U.S. Cl. ........................ 354/234.1; 354/271.1; 354/235.1
[58] Field of Search ..................... 354/234.1, 271.1, 354/235.1

[56] References Cited

U.S. PATENT DOCUMENTS

| | | | |
|---|---|---|---|
| 3,185,063 | 5/1965 | Ford et al. .......................... | 354/235.1 |
| 4,100,558 | 7/1978 | Koike et al. ........................ | 354/271 |
| 4,227,792 | 10/1980 | Rentschler ......................... | 354/230 |
| 4,609,273 | 9/1986 | Kaise .................................. | 354/271.1 |
| 4,695,145 | 9/1987 | Kawamoto ........................ | 354/271.1 |

*Primary Examiner*—Michael L. Gellner
*Assistant Examiner*—Daniel Chapik
*Attorney, Agent, or Firm*—Louis Weinstein

[57] ABSTRACT

The present invention relates to an exposure adjusting apparatus having a bobbin in the form of a cylinder through which a photographing light beam is able to pass and around which a coil comprising an insulating and coated conductive wire is wound, a core fixed to and supported by the bobbin to cover at least a portion of the surface of the coil around the bobbin and having a V-shaped cut portion serving as a first pole head, the force of which acts in a direction of the surface of the coil, a rotor rotatively supported around the center of winding of the coil and having a V-shaped projection opposing the V-shaped cut portion of the core.

7 Claims, 6 Drawing Sheets

1

ELECTROMAGNET APPARATUS AND APPARATUS FOR ADJUSTING EXPOSURE OF CAMERA USING THE SAME

This is a Division of application Ser. No. 08/258,094 filed Jun. 10, 1994.

BACKGROUND OF THE INVENTION

1. Field of the Invention

The present invention relates to an electromagnet apparatus and an apparatus using the same for adjusting the exposure of a camera, and more particularly to an electromagnet apparatus using a solenoid to convert electrical energy into mechanical energy and an apparatus using the same for adjusting the exposure of a camera.

2. Related Art Statement

An electromagnet typically has a magnetic core made of ferromagnetic material, around which an electromagnetic coil is wound, to utilize a magnetic operation of an electric current flowing through the coil so that mechanical force is generated.

Electromagnets of the foregoing type are classified into a variety of structures exemplified by a solenoid type electromagnet, a clapper type electromagnet, an electromagnet formed by combining the solenoid type and the clapper type, and rotary core type electromagnet.

Among the foregoing electromagnets, the solenoid type electromagnet includes a moving core, the attractive force of which acts on the inside of the electromagnetic coil. The foregoing structure exhibits restricted change in the leakage flux with respect to the stroke as compared with the other structures. Therefore, the attractive force is not changed considerably with respect to the stroke. It leads to a fact that the solenoid type electromagnet can be used suitably for a structure involving a long stroke. The solenoid type electromagnet usually has one pole head for generating the attractive force.

In comparison to the solenoid type electromagnet, the clapper type electromagnet has a moving core disposed on the outside of the electromagnetic coil to face the fixed core. Although the foregoing structure finally generates large attractive force, the leakage flux is enlarged considerably if the air gap is large. Therefore, the attractive force is changed considerably with respect to the stroke. As a result, the clapper type electromagnet is used in a structure involving a short stroke. The clapper type electromagnet has a moving core in the form of a plain head and usually includes two pole heads for generating the attractive force.

The electromagnet formed by combining the solenoid type and the clapper type has a structure that a portion of the clapper-shape moving core is attracted to the inside of the electromagnetic coil. Since the characteristics of the solenoid type structure are added to the moving core, large attractive force can be obtained even if the structure has a long stroke.

The rotary core type electromagnet has a structure that the magnetic pole of the moving core is formed into an unbalanced shape with respect to the center of the magnetic pole. Thus, the attractive force of the rotary core type electromagnet acts as rotary force on the rotational shaft of the moving core.

However, the solenoid type electromagnet has the plunger that moves only along a straight line. Since each of the electromagnets formed by combining the solenoid type and the clapper type and the rotary core type electromagnet has center of rotation orthogonal to the center of winding of the solenoid, there arises a problem in that the structure requires a large space.

There have been suggested a variety of apparatuses for adjusting the exposure of a camera of a type that is operated when electric power is supplied to the solenoid thereof.

For example, shutters each having an arrangement that a straight-moving type plunger solenoid is used as an actuator thereof have been disclosed in Japanese Patent Laid-Open No. 4-194912 and Japanese Patent Application No. 4-089015.

However, the structure disclosed in Japanese Patent Laid-Open No. 4-194912 and having a large-size plunger solenoid encounters a problem that the size of the camera will be enlarged and the size of the camera will be increased if the plunger solenoid is disposed in the body of the camera in a case where the structure is adapted to a camera having a lens barrel that projects over the body of the camera. If the plunger solenoid is disposed in the lens barrel, a similar problem arises in that the size of the lens barrel cannot be reduced and accordingly the size of the camera is enlarged excessively.

Since each of the shutters disclosed in Japanese Patent Laid-Open No. 4-194912 and Japanese Patent Application No. 4-089015 has the structure that the plunger is moved straight, the shutter is undesirably opened when the camera receives an impact. Moreover, the structure of the foregoing shutter having an arrangement that the plunger and the sector are disposed at unbalanced positions causes the shutter speed to be changed due to the dead weight of the plunger and/or the sector, that is a speed difference due to attitude of the camera takes place if the camera is held vertically or laterally.

OBJECTS AND SUMMARY OF THE INVENTION

A first object of the present invention is to provide a small electromagnet apparatus.

A second object of the present invention is to provide a small exposure adjusting apparatus for a camera.

A third object of the present invention is to provide a small electromagnet apparatus capable of generating a rotational force.

A fourth object of the present invention is to provide an electromagnet apparatus capable of preventing energy loss.

A fifth object of the present invention is to provide a small exposure adjusting apparatus for a camera which can be efficiently accommodated in a lens barrel.

A sixth object of the present invention is to provide an efficient rotary-type electromagnet apparatus, the force of which can be maintained even if the rotational angle is enlarged.

A seventh object of the present invention is to provide a rotary-type electromagnet apparatus capable of generating large rotary torque.

An eighth object of the present invention is to provide an electromagnet apparatus capable of generating rotational force having a rotational axis coaxial with the center of a winding of a solenoid with a small space required.

A ninth object of the present invention is to provide a small exposure adjusting apparatus for a camera capable of preventing attitude difference and impact exposure.

A tenth object of the present invention is to provide an electromagnet apparatus capable of efficiently generating rotational force having a rotational axis coaxial with the center of winding of a solenoid and exhibiting small energy loss with a small space required.

An eleventh object of the present invention is to provide a small exposure adjusting apparatus for a camera which is capable of preventing attitude difference and impact exposure and which can efficiently be accommodated in a lens barrel.

Briefly, according to the present invention, there is provided an electromagnet apparatus using a solenoid to convert electric energy into mechanical energy, comprising: a first ferromagnetic member disposed on a surface of the solenoid and having a first pole head disposed in at least a portion of the surface; and a second ferromagnetic member having a second pole head disposed to face the first pole head at a predetermined air gap interposed and attractively rotating with respect to the first ferromagnetic member when an electric current is allowed to flow through the solenoid. There is also provided an exposure adjusting apparatus comprising: a frame having an opening through which light reflected by an object is able to pass and which has an outer surface around which a solenoid is wound; a first ferromagnetic member fixed to and supported by the frame and having a covering portion for covering a portion of an outer surface of the solenoid and a first pole head formed on the covering portion; a second ferromagnetic member rotatably disposed around a center of the solenoid, having a second pole head disposed to face the first pole head at a predetermined air gap interposed and attractively rotating with respect to the first ferromagnetic member when an electric current is allowed to flow through the solenoid; sector means for limiting passing of the photographing light beam in synchronization with the attractive rotations of the second ferromagnetic member; and moving means for moving the second ferromagnetic member to a predetermined position when the attractive rotations have been canceled.

These, as well as other objects and advantages of the present invention will become further apparent from the following detailed explanation.

DETAILED DESCRIPTION OF THE PREFERRED EMBODIMENTS

Preferred embodiments of the present invention will now be described with reference to the drawings.

Figure 1:
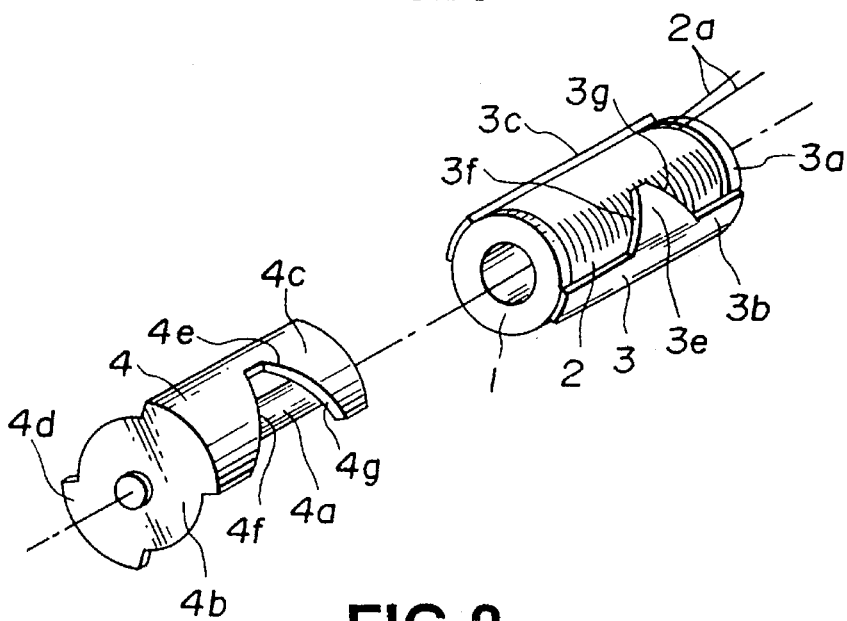
FIG. 1 is an exploded perspective view illustrating an electromagnet apparatus according to a first embodiment of the present invention being exploded in an axial direction.
Figure 2:
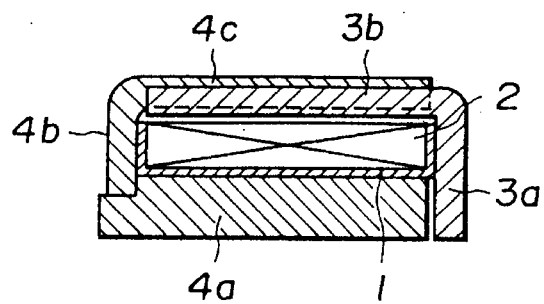
FIG. 2 is a cross-sectional view illustrating an upper half of the electromagnet apparatus according to the first embodiment when it is cut with a plane including a central axis.
Figure 3:
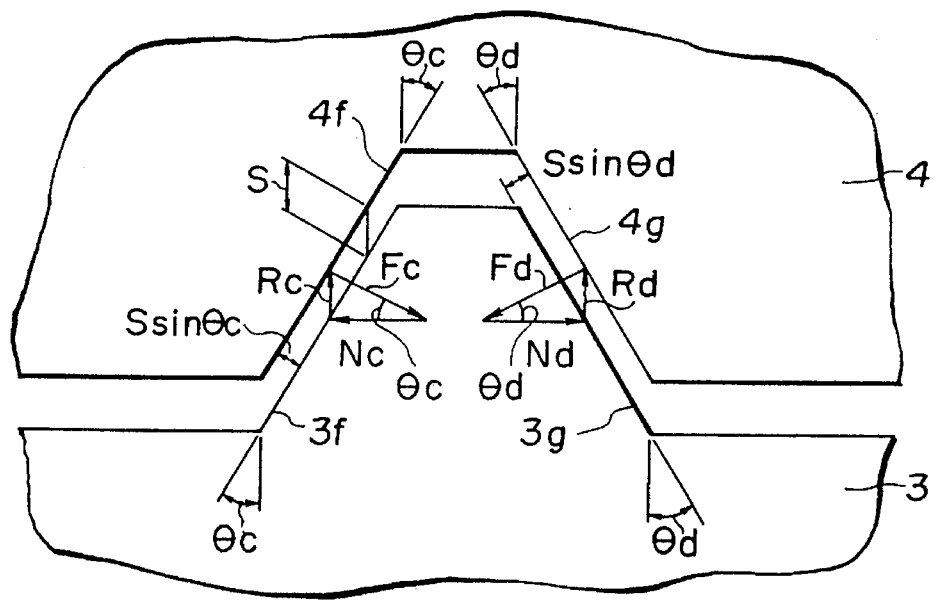
FIG. 3 is a plan view illustrating opposing slants serving as pole heads of a core and a rotor of the first embodiment by developing them.

FIGS. 1 to 3 illustrate a first embodiment of the present invention.

A bobbin 1 is made of non-magnetic material, such as a resin, and formed into a substantially cylindrical shape, the bobbin 1 having a flange at each of the two ends thereof. A coil 2 made of electroconductive wire having a surface covered with insulating material, that is, so-called enamel wire or the like, is wound a plurality of times around the bobbin 1. The coil 2, serving as a solenoid has two ends $2a$ at which the winding starts and terminates, respectively, the two ends $2a$ extending over the bobbin 1.

A core 3 made of a ferromagnetic material such as free-cutting steel or the like is integrally supported by the bobbin 1 in such a way that the core 3 is placed along the outer surface of the bobbin 1. The core 3 has a disc-like flat portion $3a$ positioned in contact with an axial-directional end surface of the bobbin 1. The disc-like flat portion $3a$ has integral circular-arc portions $3b$ and $3c$ extending from substantially bisected positions in the circumferential direction thereof. Each of the circular-arc portions $3b$ and $3c$ has a projection $3e$ serving as a first pole head and formed into a substantially isosceles trapezoid projecting from substantially the central portion thereof along the circumferential direction of the bobbin 1. The projection $3e$ has two slants $3f$ and $3g$.

A rotor 4 comprises a rod-like shaft portion $4a$ made of free-cutting steel or the like and serving as the center of rotation, the rotor 4 further comprising a disc portion $4b$ integrally connected to an end of the shaft portion $4a$ by caulking or the like. The disc portion $4b$ has circular-arc portions $4c$ and $4d$ extending from substantially bisected positions in the circumferential direction thereof. Each of the circular-arc portions $4c$ and $4d$ has a cut portion $4e$ corresponding to the projection $3e$ of the core 3 and formed into a substantially isosceles trapezoid to serve as a second pole head. The cut portion $4e$ has slants, i.e. slanted edges $4f$ and $4g$ corresponding to the projection $3e$.

The rotor 4 arranged as described above is supported rotatively around the bobbin 1 in such a way that its shaft portion $4a$ is inserted into an internal hole of the bobbin 1. The shaft portion $4a$ of the rotor 4 and the flat portion $3a$ of the core 3 are disposed to have a small gap so that they are not in contact with each other.

The operation of this embodiment will now be described with reference to FIG. 3.

When an electric current is allowed to flow through the coil 2, a magnetic field is generated. As a result, attractive forces Fc and Fd are respectively generated between the slant $3f$ and the slant $4f$ and between the slant $3g$ and the slant $4g$.

Assuming that each of the areas of a gap between the slant 3f and the slant 4f and that between the slant 3g and the slant 4g in the direction of rotation (in the circumferential direction) is S, the angle made in the circumferential direction by the slant 3f and the slant 4f is θc and the angle made in the circumferential direction by the slant 3g and the slant 4g is θd, the following relationships substantially expressed as follows are held:

$$F_c = \frac{k}{(S\sin\theta_c)^2}$$

$$F_d = \frac{k}{(S\sin\theta_d)^2}$$

where k is a quantity determined by the electric current allowed to flow through the coil 2 or the like and k may be considered to be a constant here.

The attractive forces Fc and Fd are balanced by rotational loads Rc and Rd and axial-directional reactions Nc and Nd which are exemplified as follows:

$R_c = F_c \sin\theta_c$
$R_d = F_d \sin\theta_d$
$N_c = F_c \cos\theta_c$
$N_d = F_d \cos\theta_d$ Assuming that θc=θd, the following relationships are held in this embodiment:

$$F_c = F_d = \frac{k}{(S\sin\theta_c)^2}$$

$R_c = R_d = F_c \sin\theta_c$
$N_c = N_d = F_c \cos\theta_c$

Since the axial-directional reactions Nc and Nd are opposite in direction and have the same magnitude, they cancel each other.

The driving force acting on the rotor 4 in the direction of rotation is as follows:

$$R = 2R_c = 2F_c \sin\theta_c = \frac{2k}{S^2 \sin\theta_c}$$

Since the driving force in the direction of rotation is in inverse proportion to the sine function of the slant angle θc as described above, the magnitude of the force cannot be reduced as far as the angle θc is sufficiently small even if the angle of rotation is enlarged, that is, if the area S of the circumferential directional gap is enlarged.

As a result, the thus generated driving force R causes the rotor 4 to rotate the other members.

As described above, according to the first embodiment of the present invention, a rotary-type electromagnet apparatus capable of rotating coaxially with the coil can be provided while reducing the space and the cost with a simple structure necessitated. Since the reactions in the axial direction cancel each other to be zero, there can be provided an electromagnet apparatus capable of preventing occurrence of a loss due to friction or the like and thus exhibiting an excellent efficient. The structure having the pole heads each of which is formed into a slanted shape enables a rotary-type electromagnet apparatus to be provided which exhibits excellent efficiency because the force cannot be reduced even if a large rotational angle is made.

Figure 4:
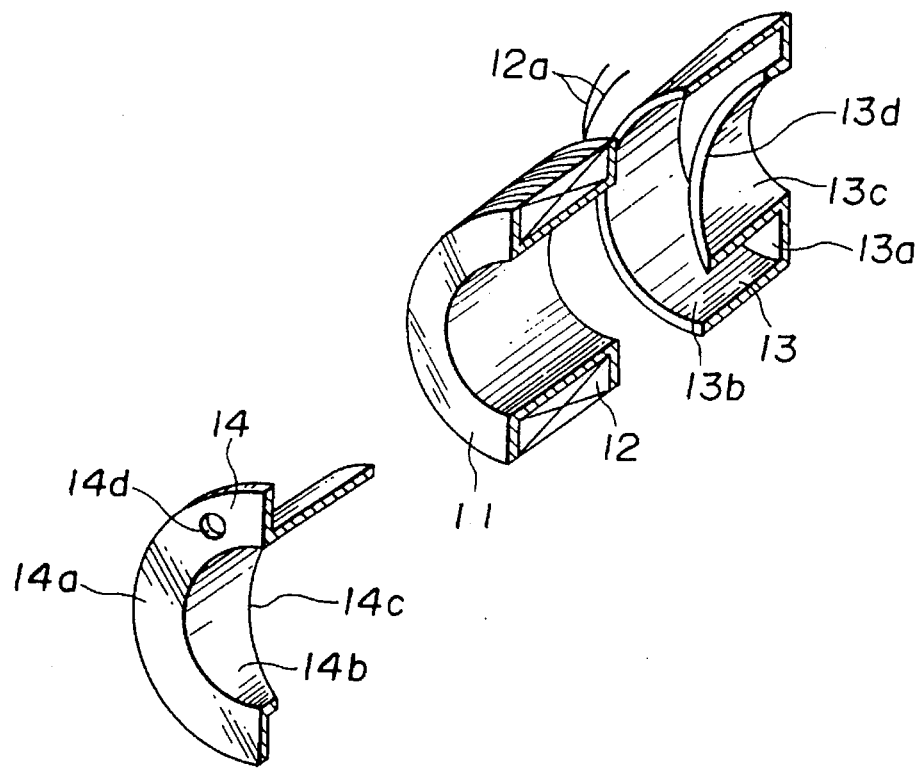
FIG. 4 is a perspective view illustrating a half of an electromagnet apparatus according to a second embodiment when it is cut with a plane including a central axis.

FIG. 4 illustrates a second embodiment of the present invention. In the description of the second embodiment, similar portions to those of the first embodiment are omitted from the following descriptions and different portions will now be described mainly. Each of elements having the same name as that of the first embodiment is made of the same material.

A coil 12 is wound around a bobbin 11 a plurality of times and has two ends 12a at which winding starts and terminates, respectively, the two ends 12a extending over the bobbin 11.

The core 13 is formed by integrating an annular disc portion 13a, an outer cylinder portion 13b and an inner cylindrical portion 13c having a slant 13d serving as a first pole head, the core 13 being attached to the bobbin 11 so as to be supported integrally.

A rotor 14 is formed by integrating an annular disc portion 14a having a hole 14d and an inner cylindrical portion 14b having a slant 14c serving as a second pole head facing the slant 13d, the rotor 14 being attached to the bobbin 11 so as to be rotatively supported.

The operation of the second embodiment will now be described.

When an electric current is allowed to flow through the coil 12 in a state where the rotor 14 is so disposed as to cause the slant 13d of the core 13 and the slant 14c of the rotor to have an adequate gap an, attractive force is, in the normal line direction, generated between the slant 13d and the slant 14c similarly to the first embodiment. The component in the rotational direction rotates the rotor 14. If a mechanism comprising, for example, a load spring to be fastened, is provided in the hole 14d of the rotor 14, the load can be driven.

In this embodiment, the axial directional attractive force is not canceled, resulting in that some loss of the rotational torque takes place.

According to the second embodiment arranged as described above, there can be provided a rotary-type electromagnet apparatus that is rotated coaxially with the coil with a simple structure and a small space at a low cost. Since the central portion has the hole as described above, a load mechanism can be accommodated in the hole and accordingly an electromagnet having a mechanism unit requiring only a small space can be realized. Furthermore, the structure having the curved pole head realizes a rotary-type electromagnet apparatus exhibiting an excellent efficiency because the force cannot deteriorate even if a large rotational angle is made.

Figure 5:
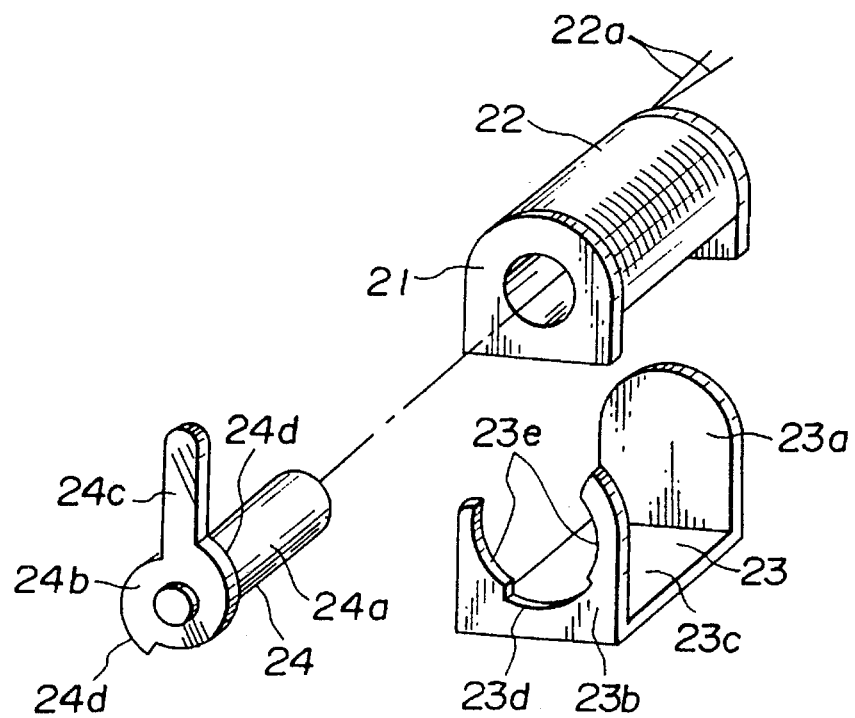
FIG. 5 is an exploded and perspective view illustrating an electromagnet apparatus according to a third embodiment of the present invention.

FIG. 5 illustrates the structure of a third embodiment of the present invention. Elements of this embodiment similar to those of the first or second embodiment are omitted from illustration and the descriptions will be mainly made about different portions. Elements having the same names as those of the first embodiment are made of the same materials.

A bobbin 21 according to the third embodiment has a straight end portion at each of the two end flange portions. A coil 22 is wound around the bobbin 21 a plurality of times and has two ends 22a at which the winding starts and terminates, respectively, the two ends 22a extending over the bobbin 21.

The core 23 is integrally supported by the bobbin 21, the core 23 comprising a flat yoke portion 23c having a substantially rectangular shape and disposed on the outside of the bobbin 21. The core 23 further comprises a pair of curved end portions 23a and 23b standing erect and covering the two end portions of the bobbin 21, the curved portion 23b standing erect having a cut portion 23d in the form of a substantially circular shape having an opened upper portion. Specifically, slants 23e are formed which serve as a first pole head composed of two symmetrical circular-arc shapes formed with respect to the rotational axis.

The rotor 24 comprises a cylindrical shaft portion 24a and a plate portion 24b integrally fixed to an end of the shaft portion 24a. By inserting the shaft portion 24a into a hole formed through the bobbin 21, the rotor 24 is supported rotatively with respect to the bobbin 21.

The plate portion 24b of the rotor 24 has an arm portion 24c projecting substantially perpendicularly to the shaft portion 24a, the plate portion 24b further having a slant 24d serving as a second pole head and composed of two sections formed symmetrically with respect to the direction of rotation.

The operation of this embodiment will now be described.

When electric power is supplied to the coil 22, attractive force acts between the slant 23e of the core 23 and the slant 24d of the rotor 24. As a result, rotational force is generated in the rotor 24. Since the attractive forces acting on the two portions are, at this time, symmetrical with respect to the rotational shaft, the forces in the radial direction are compensated with each other. Thus, a mechanism or the like (omitted from illustration) can be driven through the arm portion 24c.

According to the third embodiment arranged as described above, a rotary-type electromagnet apparatus capable of rotating coaxially with the coil can be provided while reducing the space and the cost with a simple structure necessitated. Since the radial forces can be compensated with each other, there can be provided an electromagnet apparatus capable of preventing occurrence of a loss due to friction or the like and thus exhibiting excellent efficiency. The structure having the pole head formed into a slanted shape enables a rotary-type electromagnet apparatus to be provided which exhibits excellent efficiency because the force cannot be reduced considerably even if a large rotational angle is made.

Figure 6:
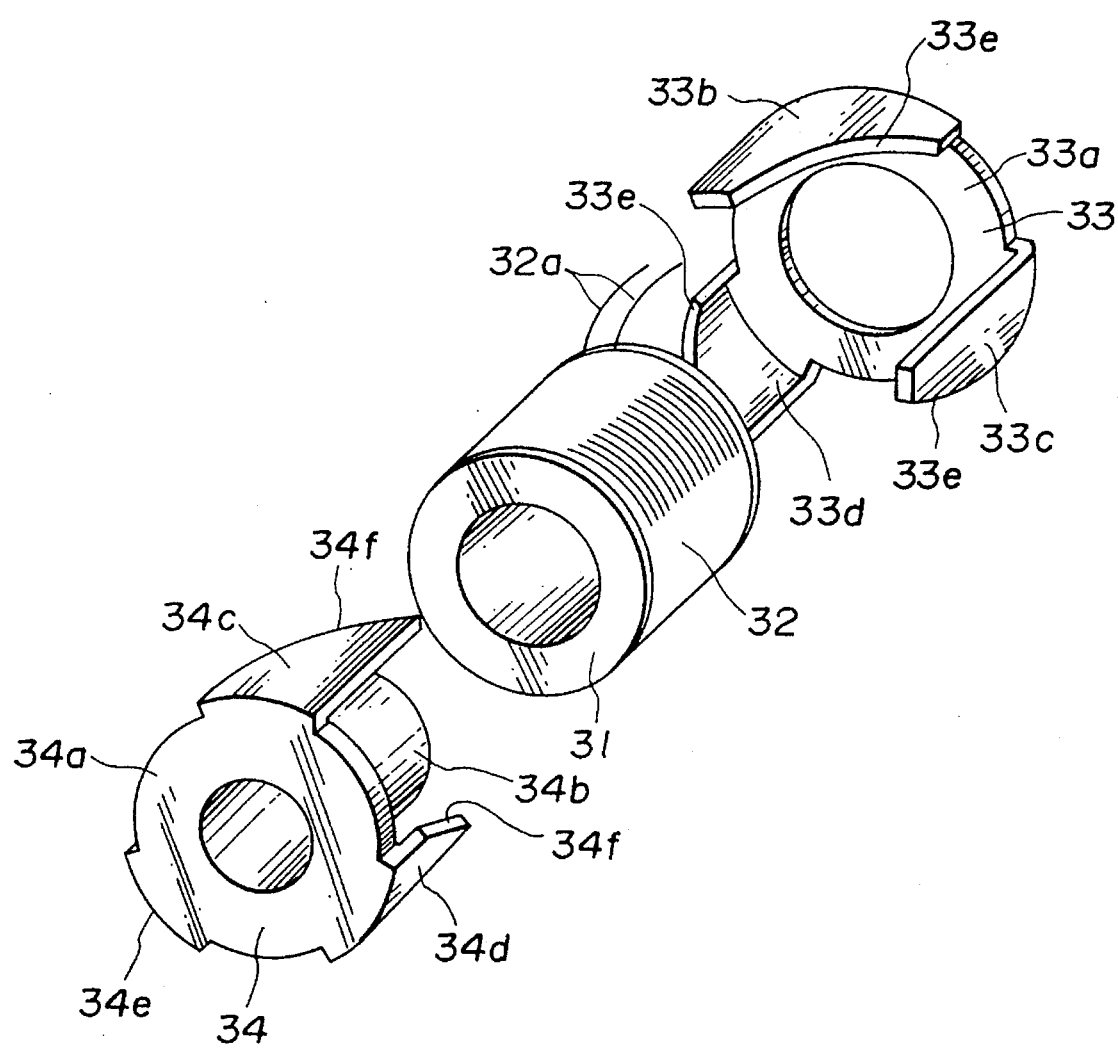
FIG. 6 is an axially exploded perspective view illustrating an electromagnet apparatus according to a fourth embodiment of the present invention.

FIG. 6 illustrates a fourth embodiment of the present invention. Elements of this embodiment similar to those of the first to the third embodiments are omitted from illustration and the descriptions will be mainly made about different portions. Elements having the same names as those of the first embodiment are made of the same materials.

A coil 32 is wound around the bobbin 31 a plurality of times and has two ends 32a at which winding starts and terminates, respectively, the two ends 32a extending over the bobbin 31.

A core 33 supported integrally with the bobbin 31 has circular-arc portions 33b, 33c and 33d disposed at substantially trisected positions in the circumferential direction thereof to be projected from the annular flat portion 33a along the outer surface of the coil 32. Each of the circular-arc portions 33b, 33c and 33d has a slant 33e serving as a first pole head.

A rotor 34 is formed by integrally connecting an end surface of a cylindrical shaft 34b and the inner end of an annular flat portion 34a to each other. The flat portion 34a has circular-arc portions 34c, 34d and 34e disposed at substantially trisected positions in the circumferential direction thereof to be projected from the outer end thereof along the outer surface of the coil 32. Each of the circular-arc portions 34c, 34d and 34e has a slant 34f serving as a second pole head to face the curved surfaces 33e of the core 33. By inserting the cylindrical shaft 34b into the internal hole of the bobbin 31, the rotor is supported rotatively with respect to the bobbin 31.

The operation of this embodiment is substantially the same as that of the second embodiment. However, the structure comprising the pole head disposed on the outer surface of the coil enables the rotational torque of the rotor 34 to be enlarged as compared with the second embodiment.

According to the fourth embodiment arranged as described above, a rotary-type electromagnet apparatus capable of rotating coaxially with the coil can be provided while reducing the space and the cost with a simple structure necessitated. The structure having the pole head formed into a slanted shape enables a rotary-type electromagnet apparatus to be provided which exhibits excellent efficiency because the force cannot be reduced considerably even if a large rotational angle is made. In addition, the structure in which the pole head is disposed on the outside of the coil, a rotary-type electromagnet apparatus exhibiting large rotational torque can be realized.

FIGS. 7 to 11 illustrate a fifth embodiment of the present invention.

Figure 7:
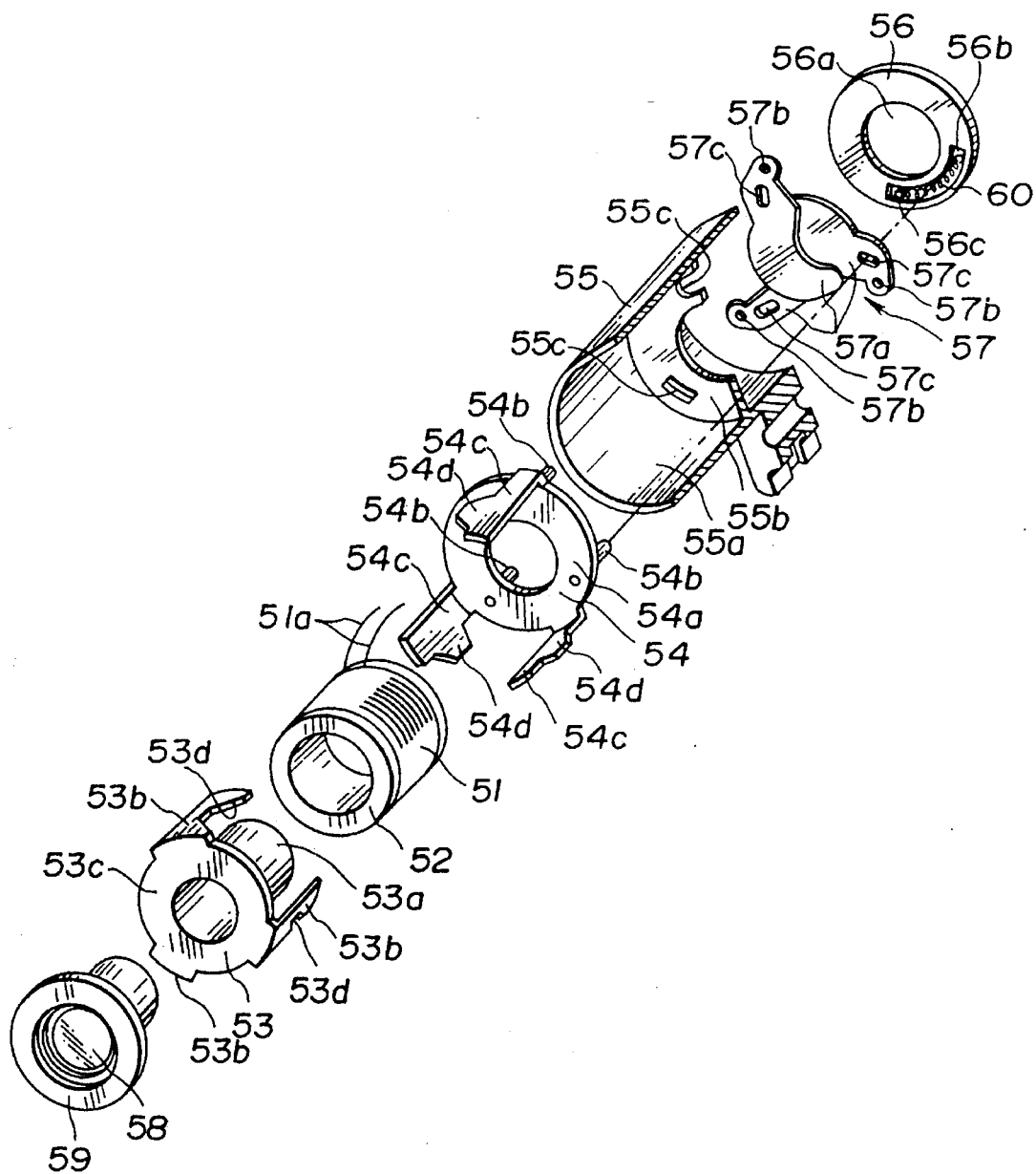
FIG. 7 is a perspective view illustrating a lens barrel having an exposure adjusting apparatus according to a fifth embodiment of the present invention.
Figure 10:
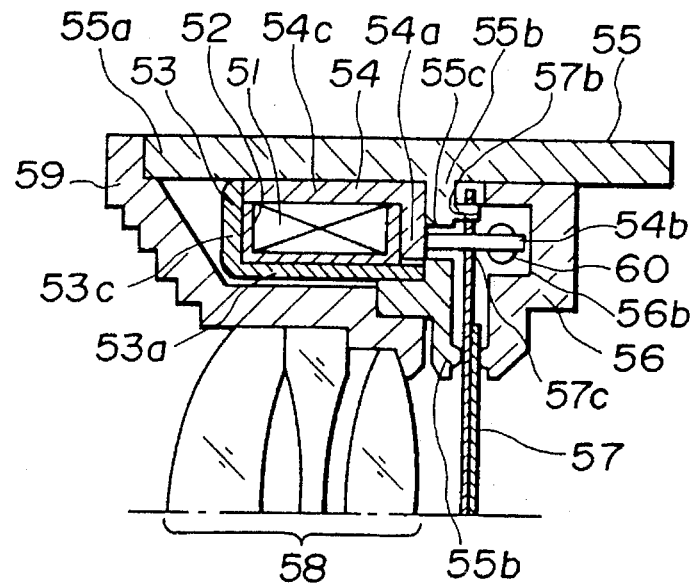
FIG. 10 is a cross-sectional view illustrating an upper half of the lens barrel according to the fifth embodiment when it is cut with a plane including a central axis.

As shown in FIGS. 7 and 10, a bobbin 52 in the form of a frame has flanges projecting over the two ends of the body of the bobbin 52, the body being formed into a cylindrical shape. As a result, light reflected by an object is able to pass through the inside portion of the bobbin 52.

Insulating and coated conductive wire 51, such as enamel wire, is wound around the bobbin 52 a plurality of times so that a coil serving as a solenoid is formed. Two ends 51a of the insulating and coated conductive wire 51 extend over the coil.

A core 53 serving as a first ferromagnetic member is formed by integrating an inner cylindrical portion 53a, three projecting and curved outer portions 53b each having a V-shaped cut portion 53d serving as a first pole head and a flange portion 53c for connecting the cylindrical portion 53a and the three outer portions 53b. The core 53 is made of free-cutting steel or the like. The core 53 is supported integrally with respect to the bobbin 52 by inserting the cylindrical portion 53a into the central opening of the bobbin 52 and placing the projecting and curved portions 53b along the outer surface of the coil.

A rotor 54 disposed on the side opposing the core 53 in such a way that the bobbin 52 is disposed between the rotor 54 and the core 53 and serving as a second ferromagnetic member is formed by integrating a hollow disc portion 54a in the form of an annular shape, three projecting pins 54b formed at an end of the hollow disc portion 54a in parallel to the central axis at substantially the same intervals, and three curved and projecting portions 54c formed at trisected positions in the circumferential direction of the outer end of the hollow disc portion 54a, the three curved portions 54c projecting in parallel to the central axis of the bobbin 52. Each of the curved portions 54c has a V-shaped projection 54d formed at a side portion in the intermediate portion of the projecting arm portion thereof, the V-shaped projection 54d corresponding to the V-shaped cut portion 53d of the core 53 and serving as a second pole head. The rotor 54 is made of free-cutting steel or the like and is supported rotatively by the bobbin 52.

The inner cylindrical portion 53a of the core 53 and the hollow disc portion 54a of the rotor 54 are disposed apart from each other by the bobbin 52 in such a way that they do not come in contact with each other while having a sufficiently long interval.

A lens barrel 55 is supported in, for example, the body of a camera (omitted from illustration) in such a way that it is able to move forwards and rearwards in the direction of the optical axis. The lens barrel 55 integrally comprises a cylindrical portion 55a and an inner flange portion 55b disposed on the inside of the cylindrical portion 55a at an intermediate position of the same, the lens barrel 55 integrally supporting the bobbin 52. The inner flange portion 55b has three elongated slots 55c formed at trisected positions in the circumferential direction of the lens barrel 55. The three elongated slots 55c each receive one of the three pins 54b of the rotor 54 inserted thereto, the three pins 54b projecting rearward.

Thus, the rotor 54 is made to be rotatable around the central axis thereof with respect to the lens barrel 55 and the bobbin 52.

A sector 57 comprises three sector blades 57a disposed symmetrically at trisected positions around the central axis and supported rotatively around a rotational shaft 57b to be capable of shutting and opening a photographing beam. The three pins 54b of the rotor 54 are respectively received by the elongated holes 57c formed in the sector blades 57, thus causing the blades of sector 57 to be opened when the rotor 54 is rotated counterclockwise when viewed in FIG. 7.

A sector receiver 56 holds the sector 57 in cooperation with the inner flange 55b of the lens barrel 55 to rotatively support the sector 57. The sector receiver 56 is a member formed into an annular shape having a circular opening 56a at the central portion thereof, the sector receiver 56 being integrally supported by the lens barrel 55. The sector receiver 56 has a circular-arc recess 56b formed adjacent to the sector 57, the recess 56b having a pin 56c projecting over the bottom surface thereof. Thus, an end of a closing spring 60 is hooked to the foregoing pin 56c.

The closing spring 60 serving as a moving means comprises, for example, a tension spring and has the end which is hooked on the pin 56c of the sector receiver 56 as described above. Another end of the closing spring 60 is hooked any one of the three pins 54b projecting over the rotor 54 so as to urge the rotor 54 clockwise when viewed in FIG. 7.

A lens frame 59 is a member for integrally supporting a photographing lens 58 and formed into a substantially cylindrical shape, the lens frame 59 being integrally supported at a forward end of the optical axis of the lens barrel 55.

Figure 11:
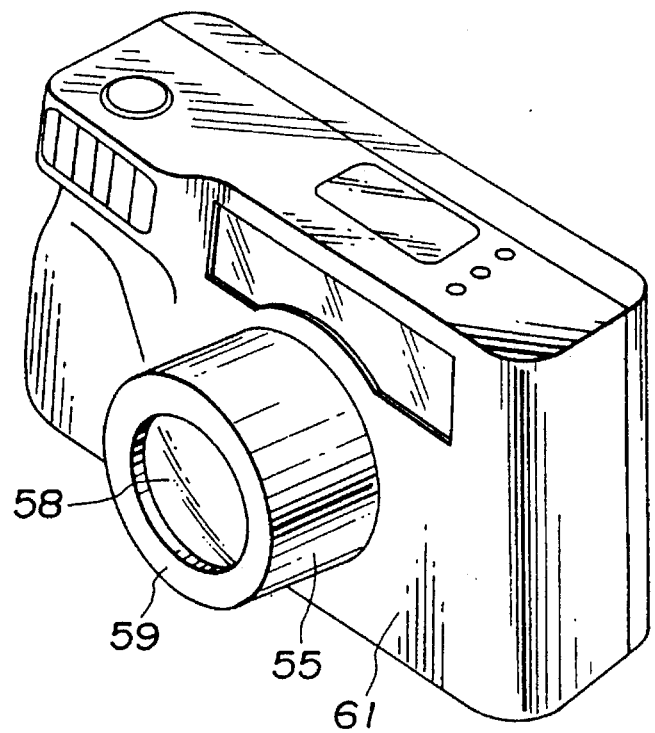
FIG. 11 is a perspective view illustrating the shape of a camera to which the fifth embodiment is applied.

When a photograph is taken, the lens barrel 55 is, as shown in FIG. 11, allowed to project over the substantially central portion of the front surface of a box shaped member 61 serving as a case member of the body of the camera so as to be capable of moving forwards and rearwards in the direction of the optical axis of the camera by a moving unit (omitted from illustration). The lens barrel 55 is moved rearwards to a position at which the front surface of the lens frame 59 and the front surface of the box shaped member 61 form the same plane to improve the portability.

The operation of the fifth embodiment will now be described with reference to FIGS. 8 and 9.

When electric power is supplied to the coil 51 in response to a signal transmitted from a releasing means, a magnetic flux is generated so that the attractive force is generated among the V-shaped cut portions 53d of the core 53 and the V-shaped projections 54d of the rotor 54 as described in the first embodiment. As a result, the rotor 54 is rotated counterclockwise when viewed in FIG. 7 against the urging force of the closing spring 60. Also the projecting pins 54b are rotated when the rotor 54 is rotated, the pins 54b being moved along the elongated holes 57c formed in the sector 57 and receiving the pins 54b.

Figure 8:
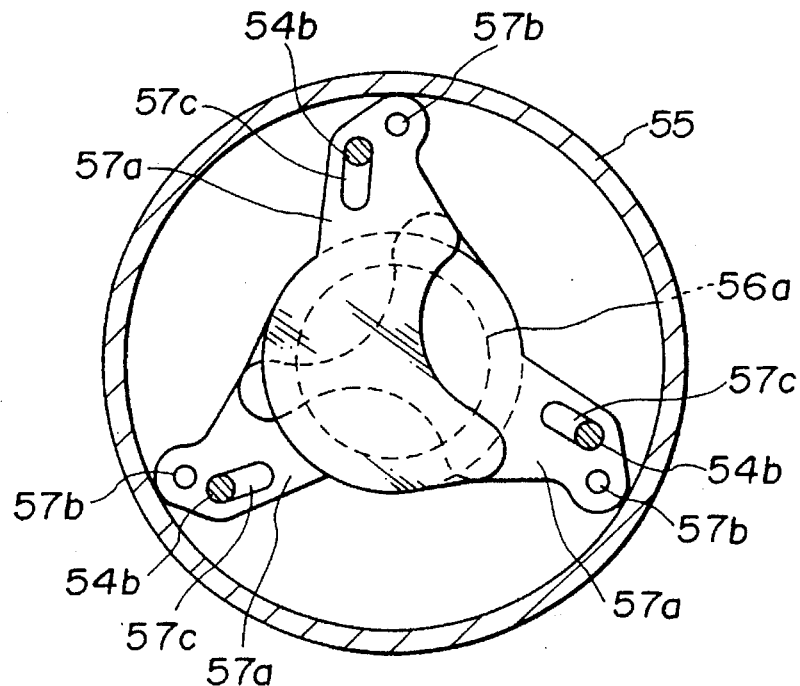
FIG. 8 is a front view illustrating a state where a sector according to the fifth embodiment is shut.
Figure 9:
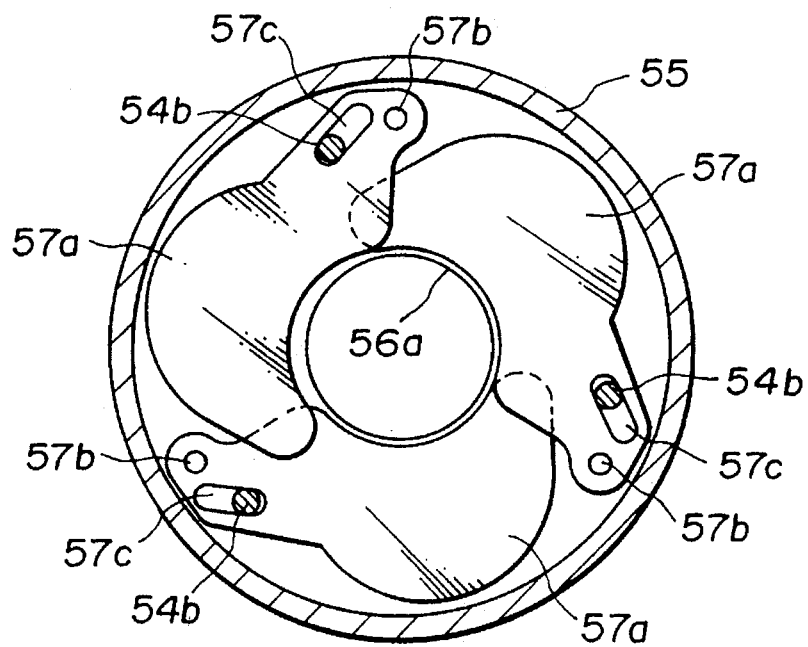
FIG. 9 is a front view illustrating a state where the sector according to the fifth embodiment is opened.

As a result, the sector 57 in the closed position as shown in FIG. 8 is rotated into an opening direction so that a state shown in FIG. 9 is realized.

A control means (omitted from illustration) computes an adequate amount of exposure corresponding to the brightness of an object or the ISO speed of the film. If the control means discriminates that the amount of exposure realized by the aperture of the sector 57 has reached the foregoing adequate amount with reference to signals supplied from a timer means and a sector position detecting means or the like (omitted from illustration), the control means stops the power supply to the coil 51.

Thus, the rotor 54 is rotated clockwise when viewed in FIG. 7 due to the urging force of the closing spring 60 so that the sector 57 is restored to the original shutting position shown in FIG. 8.

Although this embodiment comprises the sector 57 having the three sector blades 57a, the number of the sector blades is not, of course, so limited. Another structure may be employed in which an opening-directional spring having urging force weaker than that of the closing spring 60 is provided for the sector 57 so as to open the sector 57 to follow the opening-directional rotations of the rotor 54.

Although this embodiment has the arrangement that the lens barrel 55 is moved forwards or rearwards in the direction of the optical axis when focusing of the camera is performed or the lens barrel is collapsed, a lens barrel of a type which is moved forwards or rearwards at the time of zooming may, of course, be employed.

Although this embodiment has been described with reference to the shutter also having a diaphragm function, the arrangement of this embodiment may, of course, be adapted to a shutter of a type having either of the diaphragm function or the shutter function.

As described above, according to the fifth embodiment, the rotary-type electromagnet apparatus in the form of the hollow and annular shape is used as the actuator, thus enabling the size of the exposure adjusting unit to be reduced. Since the moments of the rotor around the rotational axis are balanced, an exposure adjustment unit can be provided which can be free from change in the exposure due to the difference in the attitude of the camera and which is capable of preventing undesirable opening due to an impact. In addition to the realized balanced state of the rotor, the moments of the sector around the central axis enables an exposure adjustment unit to be provided, which is capable of satisfactorily preventing a change in exposure due to an attitude change of the camera. Furthermore, the correspondence between the rotor and the sector enables the speed at which the sector is opened to be easily controlled by controlling the voltage to be applied to the electromagnet. Thus, an exposure adjustment unit of a variable-program type can be structured.

Since the shutter comprising the hollow and annular rotary-type electromagnet apparatus serving as the actuator is, in an excellent manner, accommodated on the outside of the lens frame for holding the lens, the size of the lens barrel can be reduced. Therefore, a camera of reduced thickness exhibiting excellent design can be provided.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. An exposure controlling apparatus comprising:

a frame having a hole through which a photographing light beam reflected by an object is able to pass and having an outer surface around which a solenoid is wound;

a first ferromagnetic member fixed to and supported by said frame and having a covering portion for covering a portion of an outer surface of said solenoid and a first pole head formed on said covering portion;

a second ferromagnetic member rotatively disposed around a center of said solenoid, having a second pole head disposed to face said first pole head with a predetermined air gap interposed and rotating with respect to said first ferromagnetic member when an electric current is allowed to flow through said solenoid causing the first and second ferromagnetic members to be attracted to one another;

sector means for limiting passing of said photographing light beam through said hole responsive to rotation of said second ferromagnetic member; and moving means for moving said second ferromagnetic member to a predetermined position when attractive forces between said first and second ferromagnetic members have been canceled.

2. An exposure adjusting apparatus according to claim 1, wherein said second ferromagnetic member has a projection extending in a direction of an optical axis, said sector means being pivotally supported so as to be capable of opening and shutting, said projection being connected to said moving means for selectively opening and shutting said sector means.

3. An exposure adjusting apparatus according to claim 2, wherein said frame, said first ferromagnetic member and said second ferromagnetic member are accommodated in a lens frame having flange portions, and a first flange portion has a supporting portion for supporting a hole, through which said projection passes, and said sector means.

4. An exposure adjusting apparatus according to claim 3, wherein said lens frame has a second flange portion disposed to face said first flange portion, and said moving means comprises urging means disposed in an elongated hole of said second flange portion.

5. An exposure adjusting apparatus according to claim 4, wherein said urging means normally urges said sector means in a closing direction.

6. An exposure adjusting apparatus according to claim 1, wherein said first and second ferromagnetic members are made of free-cutting steel.

7. An exposure adjusting apparatus according to claim 1, wherein said first and second ferromagnetic members have moments around a central axis of said solenoid which are balanced when said solenoid is in a state where no electric power is supplied thereto.

* * * * *